United States Patent [19]

Teraoka et al.

[11] Patent Number: 4,777,563
[45] Date of Patent: Oct. 11, 1988

[54] THIN TYPE ELECTRONIC INSTRUMENT

[75] Inventors: Hirohito Teraoka; Yoshiaki Asami; Shintaro Suzuki, all of Tokyo, Japan

[73] Assignee: Toshiba Battery Co., Ltd., Tokyo, Japan

[21] Appl. No.: 43,467

[22] Filed: Apr. 28, 1987

[30] Foreign Application Priority Data

May 2, 1986 [JP] Japan .................. 61-102262
May 9, 1986 [JP] Japan .................. 61-104722
Jul. 21, 1986 [JP] Japan .................. 61-169862

[51] Int. Cl.$^4$ ............................................. G06F 15/02
[52] U.S. Cl. ................................... 361/395; 200/5 A; 364/708; 235/145 R; 320/2
[58] Field of Search ............... 200/5 A; 361/380, 392, 361/395, 399, 417, 419; 174/52 PE; 235/145 R; 340/365 R; 364/700, 708; 320/2

[56] References Cited

U.S. PATENT DOCUMENTS

| 4,542,260 | 9/1985 | Pearce | 261/395 |
| 4,546,412 | 10/1985 | Nakazawa | 361/395 |
| 4,558,427 | 12/1985 | Takeuchi | 364/708 |
| 4,567,354 | 1/1986 | Sekine | 200/5 A |
| 4,670,664 | 6/1987 | Hara | 200/5 A |

FOREIGN PATENT DOCUMENTS 49-12823 2/1974 Japan .
61-15396 4/1986 Japan .

Primary Examiner—G. P. Tolin
Attorney, Agent, or Firm—Foley & Lardner, Schwartz, Jeffery, Schwaab, Mack, Blumenthal & Evans

[57] ABSTRACT

Disclosed in a thin type electronic instrument having a structure comprising a circuit base plate for mounting an integrated circuit chip thereon and a power source battery for supplying power to the circuit base plate sandwiched between a pair of synthetic resin sheets opposed to each other, with the pair of synthetic resin sheets being plastered at the peripheral portions thereof, characterized in that a substrate made of a metal is interposed between the pair of synthetic resin sheet.

The thin type electronic instrument of the present invention is improved in mechanical durability against mechanical shock such as warping or torsion by a stress during carrying or usage, whereby erroneous actuation or breaking can be inhibited.

9 Claims, 3 Drawing Sheets

PRIOR ART

THIN TYPE ELECTRONIC INSTRUMENT

BACKGROUND OF THE INVENTION

This invention relates to a thin type electronic instrument equipped with a circuit base plate having an integrated circuit chip mounted thereon and various functional devices such as power source battery for supplying power to said circuit base plate, etc.

In recent years, various thin type electronic instruments have been developed by making thinner small electronic calculators, such as card type pocket calculators equipped with an integrated circuit chip and a power source for supplying power to said circuit between resin sheets and IC card having memory function and clock function, etc.

The power source to be used in the thin type electronic instruments as mentioned above is required to have a thickness which is 1 mm or less, and for that purpose, for example, in card type pocket calculators having no memory function, etc., a thin solar battery with a thickness of about 200 um is used as its power source battery. However, in a thin type electronic instrument equipped with memory function and clock function, if a solar battery is used as the power source, in absence of light source, electric generation is stopped, whereby no power is supplied to the memory circuit of the integrated circuit chip or the clock circuit, whereby troubles are caused in maintenance of memory or clock function. For this reason, as the power source battery used for a thin type electric instrument endowed with memory function such as the above IC card, etc., a flat battery capable of supplying always power has been demanded. For such demand, there has been proposed a flat battery with a structure having a generating element comprising a positive electrode sheet 3, a negative electrode sheet 4 and a separator 5 interposed between these sheets 3 and 4 housed between the positive and negative electrode terminal plates 1 and 2 opposed to each other functioning as both armoring and current collector, and also having an insulating sealing member 6 shaped in a frame at the peripheral portion of the above positive and negative electrode terminal plates 1 and 2 to seal that portion as shown in FIG. 5 (Japanese Unexamined Patent Publication No. 128232/1974 claiming priority based on Convention Application No. 344,883 filed Mar. 26, 1973 in the United States).

In this connection, as the thin type electronic instrument having the above flat battery assembled therein, one having the structure shown in FIG. 6 has been known(Japanese Unexamined Patent Pablication No. 15396/1986). That is, in the Figure, 11 and 12 are upper and lower sheets opposed to each other comprising a synthetic resin. Between these sheets 11 and 12 is housed the circuit base plate 13 and the flat battery 14 shown in FIG. 5 as described above. On the surface of the above circuit base plate 13, there are mounted an integrated circuit chip, passive element such as condenser, etc., not shown. Also, the positive and negative electrode terminal plates 1 and 2 of the above flat battery 14 are connected through the lead terminals 15 and 16 having spring characteristic to the wiring (not shown) formed on the front and back surfaces of the above circuit base plate 13 so that power of said battery 14 can be supplied to the integrated circuit chip, etc., on the circuit base plate. Also, at the peripheral portion between the above upper and lower sheets 11 and 12, there is interposed a frame-shaped sealing sheet 17 to effect plastering between the respective upper and lower sheets 11 and 12 and the frame-shaped sheet 17 by heat fusion or through an adhesive, thereby sealing the circuit base plate 13 having the above integrated circuit chip, etc., mounted thereon and the flat battery 14.

However, when a thin type electronic instrument with a structure shown in FIG. 6 is applied for card type pocket calculator or IC card, an inevitable stress is applied during carrying or usage thereof, and consequently there has been the danger that the card may be warped to lose the inherent function of the card. Also, since connection between the flat battery 14 and the circuit base plate 13 having integrated circuit chip, etc., mounted thereon is effected by use of lead terminals 15 and 16 connected resiliently to the positive and negative electrode terminals 1 and 2 of the battery 14, if the thickness of the battery 14 is not changed, the film thickness of the thin type electronic instrument becomes thicker corresponding to the thickness of the respective terminals 15 and 16. However, since the thickness of the thin type electronic instrument is restricted, the battery 14 itself cannot be made thicker during use of the above lead terminals 15 and 16, namely it becomes difficult to enhance the discharging capacity of the battery. This makes it difficult for thin type electronic instrument to respond to usage for a long term. Further, in the instrument shown in FIG. 6, the integrated circuit chip mounted on the circuit base plate 13 and lead terminals 15, 16 form convex portions, and other sites concave portions, whereby such concave or convex unevenness appears on the surface of the upper and lower sheets 11, 12 as such, to ensue the problem that the appearance as a whole of the instrument is impaired.

SUMMARY OF THE INVENTION

The present invention has been accomplished in order to solve all of the problems of the prior art as described above, and it is intended to provide a thin type electronic instrument which can inhibit warping of the instrument by a stress during carrying or usage, is also increased in discharging capacity of the battery in spite of being further thinner than the case of the prior art and yet has a novel structure with good appearance.

The present invention is a thin type electronic instrument having a structure comprising a circuit base plate for mounting an integrated circuit chip thereon and a power source battery for supplying power to said circuit base plate sandwiched between a pair of synthetic resin sheets opposed to each other, with said pair of synthetic resin sheets being plastered at the peripheral portions thereof, characterized in that a substrate made of a metal is interposed between said pair of synthetic resin sheets.

And, according to a preferred embodiment of the instrument, the substrate made of a metal interposed between a pair of synthetic resin sheets should be preferably one of the two sheets of terminal plates in a flat battery as described below. Further, the instrument should preferably have a structure in which an adhesive layer is interposed within the space except for the portion occupied by various members housed within the instrument, particularly within the space formed between the upper and lower sheets and the surfaces of the respective members.

DESCRIPTION OF PREFERRED EMBODIMENTS

The present invention is described in more detail by referring to the accompanying drawings showing preferred embodiments of the present invention.

Figure 1:
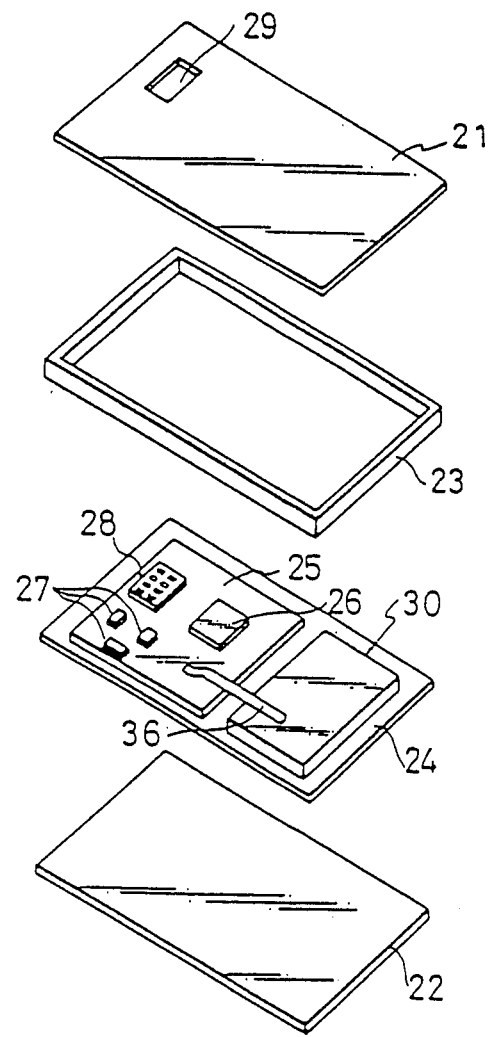
FIG. 1 is an exploded perspective view of the thin type electronic instrument showing an example of the present invention.
Figure 2:
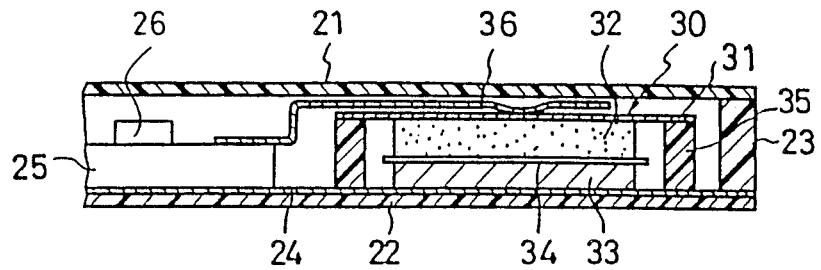
FIG. 2 is a longitudinal sectional view of the pertinent portion of the thin type electronic instrument shown in FIG. 1.

FIG. 1 is an exploded perspective view of the instrument of the present invention, and FIG. 2 is an example of its longitudinal sectional view.

In the Figures, 21, 22 are upper and lower sheets opposed to each other comprising a synthetic resin such as vinyl chloride resin, etc. Between these sheets 21 and 22, there are sandwiched a frame-shaped sealing sheet 23 comprisng a synthetic resin such as vinyl chloride resin, etc., and a substrate 24 made of a metal, and both are laminated and plastered by applying hot press working on the respective end surfaces of the above upper and lower sheets 21 and 22 and the frame-shaped sealing sheet 23 contacted with those sheets. The substrate 24 made of a metal is formed of, for example, nickel steel, titanium steel, aluminum steel, berylium steel, stainless steel, etc.

On the above substrate 24 made of a metal, a circuit base plate 25 is provided. On the surface of the circuit base plate 25, a large scale integrated circuit chip (LSI chip) 26 and a chip part 27 such as chip condenser, etc., are mounted. Also, the above circuit base plate 25 is provided with an external connecting terminal 28 having, for example, 8 terminals aligned thereon, and said external connecting terminal 28 is fitted into the window portion 29 opened at the above upper sheet 21 so as to be exposed out from the above upper surface sheet 21. Shortly speaking, memorizing and reading of information of the electronic instruments can be done through the contact point of the above external connecting terminal 28. Electrical communication is maintained between battery 30 and the various electrical components disposed on substrate 24, e.g., LSI 26 and chip part 27, by conventional wiring (not shown) as is well known in the art.

Figure 3:
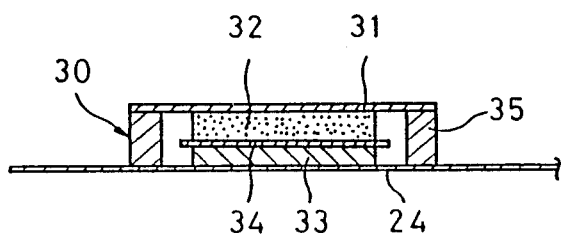
FIG. 3 is a sectional view of the flat battery assembled in the instrument of the present invention.

30 is a power source battery to be assembled on the above substrate 24 made of a metal, and it is a flat battery with a structure as shown in FIG. 3.

That is, the flat battery 30 houses a generating element comprising a positive electrode sheet 32, a negative electrode sheet 33 and a separator 34 interposed between these sheets 32 and 33 between the positive electrode terminal plate 31 functioning as both armoring and current collector and the substrate 24 made of a metal functioning as the above negative electrode terminal plate, and also has a structure sealed by interposing a frame-shaped insulating sealing member 35 at the peripheral portion between the above positive electrode terminal plate 31 and the substrate 24 made of a metal.

This flat battery has a specific feature in the dimension of one of the positive and negative electrode terminal plates as described above, and is not particularly limited in the constituent materials of the respective constituent elements.

The flat battery 30 shown in FIG. 3 is made to have a shape and dimensions so that the negative electrode terminal plate of the positive and negative electrode terminals may be protruded from the outer peripheral portion of the insulating sealing member 35. In other words, the substrate 24 made of a metal functioning as the negative electrode terminal plate is required to have a size equal to or smaller than that of the instrument and yet a size capable of functioning sufficiently as the negative electrode terminal plate. For example, in the case of IC card, the dimensions are defined by the International Standardization Organization (ISO) as 53.92 to 54.03 mm for width and 85.47 to 85.72 mm for length. Accordingly, the width of the substrate 24 made of a metal should be preferably 54.03 mm or less and the length 85.72 or less. On the other hand, in order for the substrate 24 made of a metal to function sufficiently as the negative electrode terminal plate and prevent warping of card, the width should be preferably 24.03 mm or more and the length 55.72 mm or more.

As described above, on the above substrate 24 made of a metal, the flat battery 30 is arranged integrally as one electrode terminal plate (negative electrode terminal plate in the Figure) which functions as both armoring and current collector on a part of the substrate 24 made of a metal. Also, the positive electrode terminal plate 31 of the above flat battery 30 is connected to the wiring (not shown) formed on the surface of the above circuit base plate 25 through the lead terminal 36 having spring characteristic. In short, the structure is made so that maintenance of the memory can be made by feeding the power of the above flat battery 30 to the large scale integrated circuit chip 26, the chip part 27, etc., together with the above lead terminal 36 and the substrate 24 made of a metal connected to the back of the above circuit base plate 25.

Figure 4:
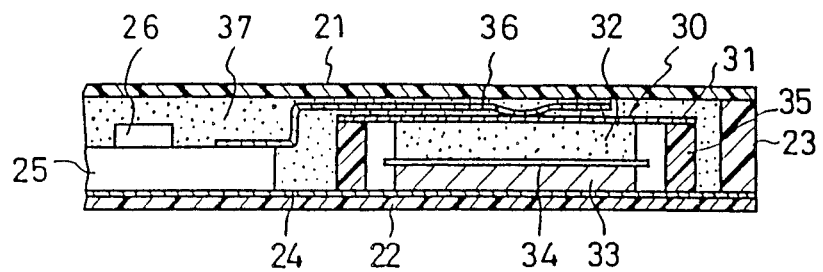
FIG. 4 is a longitudinal sectional view of the electronic instrument of the present invention when an adhesive layer is interposed.

Also, as is apparent from FIG. 2, since various members as described above are arranged between the respective upper surfaces of the circuit base plate 25, the flat battery 30 and the upper sheet 21, irregular spaces are formed which may also cause unevenness of the surface to be formed on the upper sheet. Therefore, in the instrument of the present invention, it is preferable to make a structure in which an adhesive layer is interposed in this space portion by filling various kinds of adhesives such as epoxy resin type adhesives, UV-ray curable type adhesives, etc. This embodiment is shown in FIG. 4. In the Figure, 37 is the adhesive layer.

According to such thin type electronic instrument of the present invention as shown in FIG. 1 and FIG. 2, by having a substrate 24 made of a metal comprising stainless steel plate, etc., interposed between the upper and lower sheets 21 and 22 comprising opposed synthetic resins, mechanical durability can be improved against mechanical shock such as warping or torsion, whereby erroneous actuation or breaking of the instruments can be inhibited.

Figure 5:
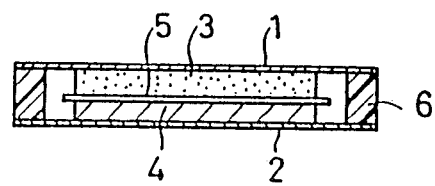
FIG. 5 is a longitudinal sectional view of the flat battery of the prior art.
Figure 6:
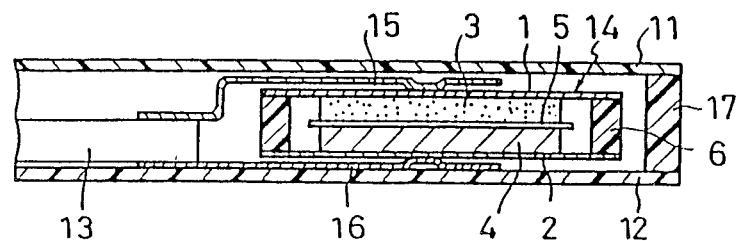
FIG. 6 is a longitudinal sectional view of the thin type electronic instrument of the prior art structure in which the battery shown in FIG. 5 is assembled.

Also, by integrating the substrate 24 made of a metal as one of the electrode terminal plates (negative electrode terminal plate in the Figures) of the flat battery 30 with said battery 30, one of the terminals of the lead terminals having spring characteristic (for example, the lead terminal 16 for negative electrode) used in the electronic instrument of the prior art shown in FIG. 5 and FIG. 6 as described above can be omitted, and the thickness of the generating element can be made thicker corresponding to its thickness. As the result, discharging capacity of the flat battery can be improved to enable use for a long term. More specifically, when the thickness of the battery is 0.5 mm and the lead terminal having spring characteristic has a thickness of 0.1 mm, theoretically 10% improvement of capacity becomes possible in the electronic instrument of the present invention as compared with the electronic instrument of the prior art, whereby sufficient discharging capacity as memory built-up IC card can be ensured.

Here, the description has been made about the constitution in which the substrate 24 made of a metal of the flat battery also functions as the negative electrode terminal plate, but the instrument of the present invention is not limited thereto, and entirely the same effect can be obtained when the constitution is made so that the substrate 24 made of a metal also functions as the positive electrode terminal plate 31. Further, the shape of the battery surrounded by the insulating sealing member is not also particularly limited, but any of rectangular, circular, L-shape may be employed, and also a part of these terminal plates may be extended slightly outwardly to provide a portion for mounting the lead terminal.

Further, since electrical conduction of the negative electrode terminal plate of the flat battery 30 (namely the substrate 24 made of a metal) to the circuit base plate 25 is effected through the substrate 24 made of a metal functioning also as the negative electrode terminal plate of said battery 30 without use of the lead terminal having spring characteristic as in the prior art, the conduction operation between those parts can be done with extreme ease.

By the action as described above, the thin type electronic instrument of the present invention can be used as the card type electronic instrument with the same dimensions of the credit card generally called as IC card as a matter of course, but it can also be used as the IC card having a memory back-up power. source built therein by including the flat battery. Also, it is applicable for thin type electronic computers of electronic instruments equipped with clock function, and can also be used as the embossed credit card or the magnetic system credit card equipped with magnetic stripes based on the contents investigated as the tentative standards according to the International Standardization Organization (ISO) 7816, 7810, 7811, 7812, 7813, etc.

EXAMPLE

In the following, Example of the present invention is explained by referring to FIG. 1 to FIG. 4 as described above.

First, with the use of stainless steel substrate 24 as the negative electrode terminal plate, on a part of this substrate 24 a sheet 33 of lithium which is the negative electrode active material was pressure integrated and a sheet 32 composed mainly of manganese dioxide which is the positive electrode active material was provided by contact thereon through a separator 34. Further, on said manganese dioxide sheet 32 was laminated a positive electrode terminal plate 31 made of stainless steel and also a frame-shaped insulating sealing member 35 comprising a heat-fusible resin (e.g. ionomer resin) having the same outer dimensions as said positive electrode terminal plate 31 was arranged between said positive electrode terminal plate 31 and the substrate 24 which also functions as the negative electrode terminal plate, followed by heating of the positive electrode terminal plate 31, the substrate 24 and the insulating sealing member 35 at a temperature of, for example, 180° C. to prepare a flat battery 30 integrated with the substrate 24. The plane dimensions of the positive electrode terminal plate 31 of the flat battery 30 are 20 mm×40 mm, while the plane dimensions of the substrate 24 made of stainless steel functioning also as the negative electrode terminal plate are 85.6 mm×54.0 mm which are the same dimensions as the card shape defined according to the ISO standard. Also, the above flat battery 30 has a total thickness of 0.55 mm, since each of the substrate 24 and the positive electrode terminal plate 31 has a thickness of 0.05 mm and the generating element internally of the battery has a thickness of 0.45 mm.

Next, a circuit base plate 25 with a large scale integrated circuit chip 26 having a microcomputer and LSI memory and a chip part 27 such as chip condenser mounted thereon was arranged on the upper surface region except for the region where the above flat battery 30 is provided on the above substrate 24 made of stainless steel, and also electrically conducted to said substrate 24 through the wiring not shown formed on the back of said circuit base plate 25. Also, on the predetermined regions of the circuit base plate 25 was actually mounted an external connecting terminal 28 having 8 terminals investigated as the tentative standard according to ISO 7816 arranged thereon. Further, by use of a lead terminal 36 comprising a nickel thin type plate having spring characteristic, the positive electrode terminal plate 31 of the above flat battery 30 was connected resiliently to the wiring not shown on the upper surface of the circuit base plate 25, whereby it was rendered possible to supply power of the battery 30 to the large scale integrated circuit chip 26, etc., mounted on the circuit base plate 25 together with a substrate 24 made of stainless steel functioning also as the negative terminal plate of the flat battery 30 conducted electrically to the wiring not shown formed on the back of the circuit base plate 25.

Next, between an upper sheet 21 and a lower sheet 22 comprising a vinyl chloride resin made to have the same dimensions as the IC card according to the ISO standard (85.6 mm×54.0 mm) a frame-shaped sealing sheet 23 comprising vinyl chloride resin with an outer shape of the same dimensions as said upper sheet 21 and the substrate 24 made of stainless steel provided with the above flat battery and the circuit base plate 25 were sandwiched so that the outer connecting terminal 28 on said circuit base plate 25 was fitted into the window portion 29 of said upper sheet 21, and then an adhesive was filled in order to form the adhesive layer 37 in the space except for the space occupied by the above respective members, followed by application of hot press working of the above upper and lower sheets 21, 22 and the frame-shaped sealing sheet 23 at 170° C. with the use of an adhesive to effect plastering, thus assembling a thin type electronic instrument.

Since each thickness of the upper sheet 21 and the lower sheet 22 constituting the thin type electronic instrument of this Example assembled according to the order as described above has a thickness of 0.075 mm, the thickness of the flat battery 30 integrated as the substrate 24 made of stainless steel as the negative electrode terminal plate is 0.55 mm and the thickness of the housing space of the lead terminal 36 connecting the positive electrode terminal plate 31 to the circuit base plate 25 is 0.10 mm, the total thickness of said electronic instrument is 0.8 mm, thus realizing a sufficient thin type for uses such as IC card, etc. Besides, the thin type electronic instrument of this Example is made to have the same plane dimension as that of the IC card defined according to ISO standard (85.6 mm × 54.0 mm).

COMPARATIVE EXAMPLE

For comparison, an instrument with a structure shown in FIG. 6 was prepared. First, a thin type electronic instrument was assembled according to the same order as described in this Example, except for effecting electrical conduction of the flat battery 14 shown in FIG. 5 (plane dimension of positive and negative electrode terminal plate: 40 mm × 20 mm) resiliently to the circuit base plate 13 by connecting the positive and negative electrode terminal plates 1, 2 of said battery 14 by use of lead terminals 15, 16 having spring characteristic without use of the stainless steel substrate as shown in FIG. 6. Each thickness of the upper sheet 11 and the lower sheet 12 constituting the thin type electronic instrument of Comparative example is 0.075 mm, the thickness of the flat battery 14 is 0.45 mm, the thickness of the housing space of the lead terminal 15 conducting the positive electrode terminal plate 1 to the circuit base plate 13 is 0.1 mm, and the thickness of the housing space of the lead terminal 16 conducting the negative electrode terminal plate 2 to the circuit base plate 13 is 0.1 mm. Thus, the total thickness of said electronic instrument is 0.8 mm, which is the same thickness as the thin type electronic instrument of this Example.

Thereafter, 10 sheets each of the thin type electronic instruments of this Example and Comparative example were prepared, and for these electronic instruments, the bending test defined as the mechanical durability test of IC card according to the ISO standard was conducted and the number of actuation abnormality generated was examined. The results are shown in Table 1. The bending test was conducted with an amplitude of 2 cm in the longer side direction of the card at 30 times/min, with an amplitude of 1 cm in the shorter side direction at 30 times/min, each 250 times for the front and back of the card, which was repeated 4 times to the total of 1000 times.

TABLE 1

| | Number of actuation abnormality generated (sheet) |
|---|---|
| Example | 0 |
| Comparative example | 3 |

As is apparent from Table 1, the thin type electronic instrument of this Example, by having a substrate made of a metal interposed between the upper and lower sheets made of a resin, can be appreciated to be strong against mechanical shock such as warping of instrument, whereby actuation abnormality, etc., will be brought about with difficulty.

Also, for the flat cells assembled in the thin type electronic instruments of this Example and Comparative example, discharging capacity was examined when discharged under constant load of 68 kΩ. The results shown in Table 2 were obtained.

TABLE 2

| | Discharging capacity (mAh) |
|---|---|
| Example | 54.4 |
| Comparative example | 49.1 |

As is apparently seen from Table 2, the flat battery assembled in the thin type electronic instrument of this Example can achieve improvement of discharging capacity by about 10% as compared with the flat battery assembled in the thin type electronic instrument of Comparative example. This is due to the fact that the flat battery assembled in the thin type electronic instrument of this Example omits one of the lead terminals having spring characteristic as compared with the flat battery assembled in the thin type electronic instrument of Comparative example, whereby the thickness of the battery can be made thicker by the thickness corresponding to that of said lead terminal (0.1 mm) and the volume of the generating element internally of the battery can be made greater. Accordingly, in the thin type electronic instrument of this Example, the discharging capacity of the flat battery can be increased without changing the thickness from that of the thin type electronic instrument of Comparative example, whereby the memory function, etc., can be held for a long time correspondingly.

Also, when comparison was made with respect to appearance between the thin type electronic instrument of this Example and the instrument of Comparative example, the appearance in the case of the instrument of Example was found to be beautiful substantilly without any unevenness on its surface, but in the case of the instrument of Comparative example, convexities were observed at the sites corresponding to the various kinds of members.

In the above Example, plastering work of the peripheral portions of the upper and lower surface sheets comprising a synthetic resin was performed by use of a frame-shaped sealing sheet comprising a synthetic resin, but the instrument of the present invention is not limited to the structure prepared according to this method at all. For example, the structure can be made in which the peripheral portion of one sheet of the upper and lower sheets comprising a synthetic resin may be folded inside and plastered with the other sheet through said folded portion.

In the above Example, the shape of the substrate made of a metal was made a rectangular shape, but in the instrument of the present invention, the shape of other terminal plates which becomes opposite in polarity to the substrate made of a metal is not limited thereto. For example, it can be made a shape such as circular, L-shape, or alternatively it can be made a shape having a region slightly greater than the area in which the flat battery is integrated and also having leads for effecting connection with the circuit base plate extended integrally at one side of said region.

In the above Example, the substrate made of a metal was made to have a structure separated from a pair of resin sheets, but it can be also made to have a structure in which the substrate made of metal is provided integrally on one sheet (e.g. lower sheet) according to the vapor deposition method, the sputtering method, plating, etc. In this case, the substrate made of metal is required to be provided integrally on the region except for the peripheral portion on the sheet where frame-shaped sheet is plastered.

As described in detail above, the thin type electronic instrument of the present invention is improved in mechanical durability against mechanical shock such as warping or torsion by a stress during carrying or usage, whereby erroneous actuation or breaking can be inhibited. Also, since discharging capacity of the power source battery to be assembled can be improved by increasing the capacity of the generating element of said cell, the memory function of the instrument can be held for a long term, and further conduction operation between the power source battery and the circuit base plate can be done with extreme ease. Thus, the present invention can provide thin type electronic instruments useful for credit cards as a matter of course, and also for IC cards having memory back-up power source built therein, electronic instruments equipped with thin type electronic calculator or clock function, embossed credit card conforming with the ISO standard or magnetic system credit card.

And also, an adhesive layer exists interposed in the space except for the space occupied by the necessary members positioned within the instrument, above all between the circuit base plate, the power source battery and the upper sheet, the whole thickness becomes uniform and also no uneveness is created on the surface. Further, the thickness of a battery after discharging is generally different from that before discharging due to the expansion of active materials. However in the case of the instrument of the present invention, since the surrounding of the adhesive is solidified with an adhesive, the thickness change as mentioned above can be prevented effectively and there is also no fear of liquid leak.

What is claimed as the invention is:

1. A thin-type electronic instrument, comprising:
   a circuit base plate having an integrated circuit mounted thereon;
   a flat power source battery, having positive and negative electrode terminal plates, in electrical communication with said integrated circuit;
   a pair of opposing synthetic resin sheets having said base plate and said battery sandwiched therebetween;
   a first frame-shaped sealing member enclosing said base plate and said battery and disposed between said resin sheets, said first sealing member having substantially the same peripheral dimensions as said resin sheets and secured to the peripheral portions thereof;
   said instrument characterized in that said battery comprises a reinforcing metal substrate having the same shape as said sheets, said substrate functioning as one of said electrode terminal plates;
   said instrument further characterized in that a filling layer is interposed in the space between said synthetic sheets external to said battery.

2. The electronic instrument according to claim 1, wherein said battery comprises:
   a laminated generating element, comprising:
      a positive electrode sheet comprising positive electrode material; 'a negative electrode sheet comprising negative electrode material; and
      a separator sheet sandwiched between said positive and said negative electrode sheets;
   a second frame-shaped insulating sealing member having first and second cross-section ends, disposed about the periphery of said generating element;
   a positive electrode terminal plate covering the surface of said positive electrode sheet opposite said separator sheet; and
   a engative electrode terminal plate covering the surface of said negative electrode sheet opposite said separator sheet;
   wherein said positive electrode terminal plate is in sealed contact with said first cross-section end of said second frame-shaped sealing member and said negative electrode terminal plate is in sealed contact with said second cross section end of said second frame-shaped sealing member such that said generating element is encapsulated within the region defined by said positive and said negative electrode terminal plates and said sealing member; and
   the peripheral portion of one of said terminal plates extends beyond the outer peripheral surface of said frame-shaped insulating member.

3. The electronic instrument according to claim 1, wherein said metal substrate has a width ranging from 53.92 to 54.03 mm and a length ranging from 85.47 to 85.72 mm.

4. The electronic instrument according to claim 2, wherein said metal substrate has a width ranging from 53.92 to 54.03 mm and a length ranging from 85.47 to 85.72 mm.

5. A thin type electronic instrument, comprising a circuit base plate having an integrated circuit mounted thereon and a power source battery supplying power to said circuit base plate, said base plate and said battery being sandwiched between a pair of synthetic resin sheets opposed to each other, a first frame-shaped sealing member enclosing said battery and said base plate and disposed between said resin sheets, said first frame-shaped member being secured to the peripheral portions of said resin sheets, said instrument characterized in that said power source battery is a flat battery having a reinforcing substrate made of a metal which is the same size and shape as the synthetic resin sheets and functions as an electrode terminal plate of said battery, and that a filling layer is interposed in the space other than the portions occupied by said circuit base plate and the power source battery between said pair of synthetic resin sheets.

6. A thin type electronic instrument according to claim 5, wherein the flat battery comprises a generating element comprising a positive electrode sheet, a separator and a negative electrode sheet laminated in this order, a second frame-shaped insulating sealing member surrounding said generating element, a positive electrode terminal plate covering the entire surface of said positive electrode sheet on the side opposite to said separator comprising a mixture of positive electrode materials and one end surface of said second insulating sealing member closely in contact with these; a negative electrode terminal plate covering the entire surface of said negative electrode sheet and the other end surface of said second insulating sealing member closely in contact with these; and the whole peripheral portion of one terminal plate being extended as protruded from the outer peripheral end surface of said second frame-shaped insulating member.

7. A thin type electronic instrument according to claim 5, whwerein said reinforcing substrate is made of a metal having a width ranging from 53.92 to 54.03 mm and a length ranging from 85.47 to 85.72 mm.

8. A thin type electronic instrument according to claim 6, wherein said reinforcing substrate is made of a metal having a width ranging from 53.92 to 54.03 mm and a length ranging from 85.47 ato 85.72 mm.

9. A thin type electronic instrument according to claim 5, wherein said flat battery has a lead terminal connecting said other electrode terminal plate to said circuit base plate.

* * * * *